Figure 1:
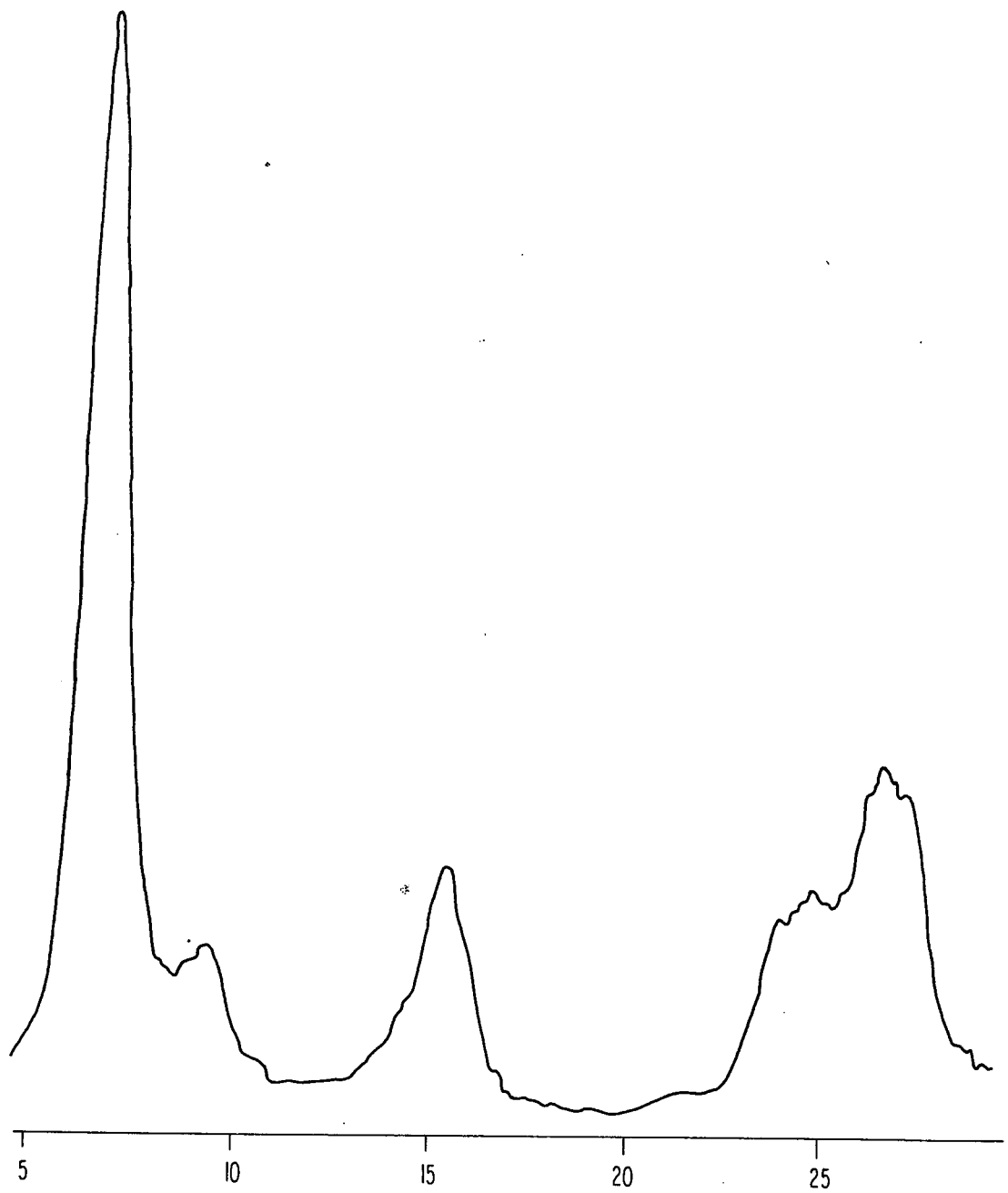

United States Patent [19]

Pigasse

[11] 4,239,685

[45] Dec. 16, 1980

[54] PROCESS FOR THE PREPARATION OF PHTHALOCYANINE PIGMENTS

[75] Inventor: Daniel Pigasse, Chantilly, France

[73] Assignee: Produits Chimiques Ugine Kuhlmann, Courbevoie, France

[21] Appl. No.: 12,169

[22] Filed: Feb. 14, 1979

[30] Foreign Application Priority Data

Feb. 21, 1978 [FR] France .................................. 78 04832

[51] Int. Cl.³ ............................................... C09B 47/04
[52] U.S. Cl. ................................. 260/314.5; 106/288 Q
[58] Field of Search .................... 260/314.5; 8/1 XA; 106/288 Q

[56] References Cited

U.S. PATENT DOCUMENTS

| | | | |
|---|---|---|---|
| 2,540,775 | 2/1951 | Brouillard et al. | 260/314.5 |
| 2,699,442 | 1/1955 | Eastes et al. | 260/314.5 |
| 3,150,150 | 9/1964 | Brand | 260/314.5 |
| 3,717,493 | 2/1973 | Griswold | 106/288 Q |
| 3,801,591 | 4/1974 | Jackson | 260/314.5 |
| 3,944,564 | 3/1976 | Hanke | 260/314.5 |
| 4,056,534 | 11/1977 | Schiessler et al. | 260/314.5 |

FOREIGN PATENT DOCUMENTS

| | | |
|---|---|---|
| 2360793 | 6/1975 | Fed. Rep. of Germany . |
| 2085008 | 12/1971 | France . |
| 2124308 | 9/1972 | France . |

*Primary Examiner*—Richard Raymond
*Attorney, Agent, or Firm*—Beveridge, DeGrandi, Kline & Lunsford

[57] ABSTRACT

A process for the preparation of phthalocyanine pigments from a phthalocyanine press paste obtained by hydrolysis of a sulphuric solution of phthalocyanine, in which a small quantity of a water-insoluble crystallizing solvent, in the presence or absence of a non-crystallizing solvent, is incorporated with stirring in said press paste, and then the solvent or solvents is or are eliminated and the paste is dried, and the pigments thus obtained are collected.

17 Claims, 2 Drawing Figures

PROCESS FOR THE PREPARATION OF PHTHALOCYANINE PIGMENTS

The present invention relates to a new process for the preparation of phthalocyanine pigments from press pastes of phthalocyanine and the pigments obtained by this process.

It is known to prepare press pastes of phthalocyanine by processes using the sulphuric manner. By the term "processes using the sulphuric manner" is meant processes of which one stage consists in dissolving the phthalocyanine in a strong acid, generally sulphuric acid, this stage being followed by hydrolysis of the acid solution of phthalocyanine. These processes do not include a grinding phase.

This type of process involves numerous problems. In fact, it is well known that the hydrolysis of the sulphuric solution constitutes a critical phase since it conditions the size of the crystals formed. If the hydrolysis is slow, a certain crystalline growth is produced and in consequence there is a reduction of the coloring power of the pigment. If the hydrolysis is rapid, the crystalline growth will be limited, the granulometry of the pigment will be finer and the tinctorial yield higher. The concepts of the speed or slowness of the hydrolysis, well known to one skilled in the art, are related to the average speed at which the phthalocyanine molecules pass from the dissolved state to the precipitated state. A rapid hydrolysis may be effected, for example, by the processes described in U.S. Pat. Nos. 2,611,771 and 2,334,312, while the slow hydrolysis may be effected by simply running the sulphuric solution in a broad stream into a large quantity of water or also by covering the sulphuric solution of phthalocyanine with water.

In the case of a rapid hydrolysis, there are obtained very fine particles, which is the desired object, but these are relatively amorphous. During the drying of these pigments, such a reagglomeration is produced that the powder obtained is dispersed only with great difficulty in varnishes, inks, paints and plastic materials, which involves a large consumption of energy in order to develop the tinctorial strength. It may even occur, especially in the case of certain plastic materials, that in spite of a large consumption of energy, a satisfactory tinctorial strength is not obtained, that is, comparable to that which is obtained with a conventional commercial pigment.

In order to overcome these drawbacks and obtain both a satisfactory tinctorial yield and a satisfactory speed of dispersion, it has been proposed to add adjuvants either to the sulphuric solution itself (cf. U.S. Pat. No. 2,359,737) or to the aqueous phase (cf. British Pat. No. 912,526). This kind of procedure may be a solution to the problem faced but its great disadvantage lies in the fact that the adjuvants are ultimately present in the water or in the pigment or, generally, in both of these. This type of process therefore necessitates the treatment of residual water which contains, in addition to the acid, sometimes considerable quantities of organic adjuvants, which makes it poorly adapted to the present constraints relating to the fight against pollution. Furthermore, the introduction of adjuvant into a pigment can restrict its field of application since the adjuvant does not exist which is compatible with all the media of application.

The object of the present invention is to obtain, without the addition of adjuvants to the sulphuric solution or to the aqueous phase, phthalocyanine pigments which are both fine and little agglomerated and which therefore on the one hand provide a high tinctorial yield (or coloring power) and on the other hand require a relatively small amount of energy for dispersion. The particular size, the degree of agglomeration, the speed of dispersion (speed which is a function of the degree of agglomeration) and the coloring power of a pigment are characteristics well known to one skilled in the art which can be quantitatively evaluated. For example, the degree of agglomeration may be evaluated by measuring the specific surface and the coloring power by colorimetry.

The desired result has now been obtained by subjecting the press paste of phthalocyanine, obtained by hydrolysis of a sulphuric solution of phthalocyanine, to a treatment which comprises incorporating in said press paste with stirring a small amount of a crystallizing solvent insoluble in water, in the further presence or absence of a non-crystallizing solvent, and then removing said solvent or solvents either by evaporation during the drying phase of the paste, or by steam-distillation before drying the paste. The crystallizing solvent may also be eliminated by solubilizing it in water either by salification if it has an acid or basic character, or by introduction of a third solvent miscible with water and with the crystallizing solvent, this phase of solubilization being followed by filtration and washing of the paste. The crystallizing solvent is recovered from the filtrate by acidification or by alkalinization.

Figure 2:
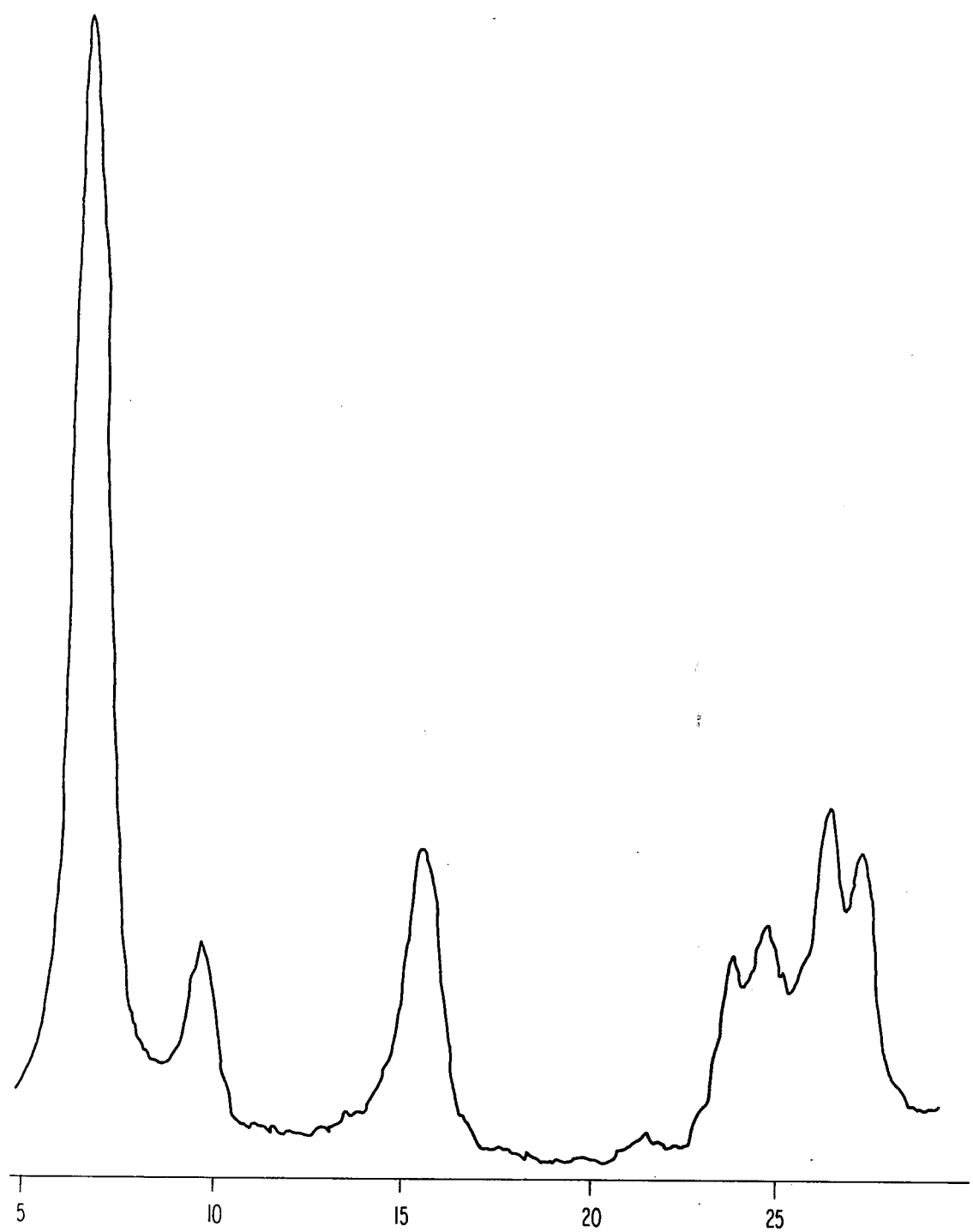

In the drawing:

FIG. 1 is an X-ray diffraction diagram of copper phthalocyanine produced according to Example 1, infra, prior to treatment with crystallizing solvent; and FIG. 2 is an X-ray diffraction diagram of said copper phthalocyanine after treatment with nitrobenzene as crystallizing solvent according to the present invention.

The phthalocyanine press paste prepared by hydrolysis, preferably by rapid hydrolysis, of a sulphuric solution of phthalocyanine is introduced, possibly diluted with water (the addition of water having the object of reducing the viscosity of the paste), into a reactor or any other apparatus which allows a good mixing of the paste and agitation thereof. A small quantity of a crystallizing solvent, to which a non-crystallizing solvent has or has not been added, is incorporated with stirring into the paste. The agitation is continued for a period which may be from some minutes to several hours, the temperature being between the ambient temperature and the boiling temperature of the binary water-solvent or water-solvents mixture. The time of treatment depends on the temperature and the nature of the solvent. Generally it is shorter as the temperature becomes higher. The solvent is then removed either by evaporation during the drying phase, which is effected, for example, in an oven provided with a device for recovering by condensation the water vapor and the solvent vapors emitted or by steam-distillation or also by solubilization in water as previously described. In these two last cases, the phthalocyanine pigment is isolated by filtration, and then dried.

The phthalocyanine press paste is preferably washed until the washings are neutral before introduction into the apparatus.

The amount of crystallizing solvent incorporated in the paste is generally from 1% to 20% by weight with respect to the weight of phthalocyanine. It is preferably from 3% to 10% by weight referred to the weight of phthalocyanine.

By crystallizing solvent within the scope of the present invention is meant any solvent corresponding to the exact definition given for a crystallizing solvent in French Pat. No. 2,265,826, the disclosure thereof being incorporated herein by reference in its entirety. Such a solvent particularly has the property of inducing the conversion of the copper phthalocyanine having the α crystalline form to the copper phthalocyanine having the β crystalline form. Examples of water-insoluble crystallizing solvents which may be used in the process of the present invention are: aromatic hydrocarbons such as benzene, toluene and the zylenes; aromatic nitro derivatives such as nitrobenzene; aromatic halogenated derivatives such as chlorobenzene, di- and tri-chlorobenzenes; alkylphenols such as nonylphenol; aromatic amines such as N-dimethylaniline and N-diethylaniline; aliphatic or alicyclic halogenated derivatives such as trichloroethylene and tetrachloroethylene; ethyl benzoate and mixtures of the above compounds, but this list is not restrictive since all such solvents as defined and disclosed in said French Pat. No. 2,265,826 may be used.

In the process according to the present invention, the water-insoluble crystallizing solvent may be incorporated in the phthalocyanine press paste as such or mixed with a non-crystallizing solvent. Examples of suitable non-crystallizing solvents are lower aliphatic alcohols such as isobutanol. The amount of non-crystallizing solvent incorporated in the paste may be from 1% to 20% by weight with respect to the weight of phthalocyanine.

The phthalocyanine press paste used in the process of the invention is in general a press paste of a metallized phthalocyanine and preferably a copper phthalocyanine press paste, which may or may not be chlorinated.

The process according to the present invention has numerous advantages. It is simple, non-polluting and enables phthalocyanine pigments to be obtained, without grinding, which are free from adjuvants, fine (particle size 0.05 to 0.5μ), only slightly agglomerated and which have a high speed of dispersion and a high coloring power. These pigments are at least on a level with the best and most desirable pigments on the market.

The results obtained by the process according to the present invention are both spectacular and surprising.

They are spectacular because if the paste is not subjected to a solvent treatment before drying, the product obtained after drying is so agglomerated that it is unusable in practice. In addition, if the paste is treated before drying with a non-crystallizing solvent such as isobutanol (cited in French Pat. No. 1,295,195), pigments of a quality comparable to that of the pigments obtained by the process of the present invention are not obtained.

The results obtained by the process of the present invention are moreover surprising. In fact, it is known by those skilled in the art that the copper phthalocyanine of reddish shade essentially in the α form obtained by hydrolysis of a sulphuric solution of copper phthalocyanine is unstable in crystallizing solvents, since by their action it is converted into phthalocyanine of β form of large particle size. However, X-ray and electron microscope examination shows that the process of the present invention does not modify the crystalline form of the copper phthalocyanine obtained by hydrolysis of a sulphuric solution, but only converts the relatively amorphous paste resulting from the hydrolysis into a well crystallized product of small particle size.

The phthalocyanine pigments obtained by the present process may be used for the conventional applications of phthalocyanine pigments (coloring of paints, inks, lacquers, plastic materials and artificial or synthetic fibers; and textile printing).

The following examples, in which the parts indicated are parts by weight unless the contrary is stated, illustrate the invention without restricting it thereto.

EXAMPLE 1

135 Parts of water and 350 parts of a copper phthalocyanine press paste containing 48.5 parts of copper phthalocyanine are placed in a reactor provided with a stirrer and a dropping funnel.

This press paste is obtained by hydrolysis according to the process of U.S. Pat. No. 2,334,812, of a sulphuric solution containing 50 parts of copper phthalocyanine, resulting from the synthesis and purified, in 400 parts of 100% sulphuric acid. According to this process (see especially Example 5 of U.S. Pat. No. 2,334,812), the hydrolysis is effected by introducing the sulphuric solution of phthalocyanine in the center of a stream of water flowing in a turbulent flow through a tube. The introduction of the sulphuric solution is effected by means of a small pipe lodged inside said tube, the pipe and the tube being concentric. The dilution ratio used, that is the ratio by weight:

(water/sulphuric solution of phthalocyanine)

used, is from 5 to 10 and preferably 7.

The stirrer is started in order to homogenize the water and the press paste and the 5 parts of nitrobenzene are introduced dropwise by the dropping funnel, this representing 10.3% by weight of nitrobenzene relative to the weight of copper phthalocyanine. Agitation is maintained for 10 minutes, then the nitrobenzene is removed by steam distillation. The product obtained is filtered and dried at 80° C.

A blue pigment (reddish-blue shade) is thus obtained, which is friable and has a high tinctorial yield and a high speed of dispersion both in organic supports such as plastic materials and in aqueous media such as the pigmentary compositions for textile printing or the coloring of emulsion paints.

A comparison of the X-ray diffraction diagrams of the copper phthalocyanine before treatment (cf. FIG. 1) and after treatment (cf. FIG. 2) with nitrobenzene as crystallizing solvent, shows that the treatment does not modify the crystalline form of the phthalocyanine, since there is no appearance of new diffracted rays, but increases the crystallinity of the product, which is manifested by a better resolution of the adjacent rays. The abscissae on FIGS. 1 and 2 represent the angle of diffraction 2θ and the ordinates the relative intensity of the rays.

EXAMPLE 2

135 Parts of water and 350 parts of a copper phthalocyanine press paste containing 48.5 parts of copper phthalocyanine are placed in a reactor fitted with a stirrer and a dropping funnel. This paste was obtained as indicated in Example 1.

The stirring is stated and the aqueous copper phthalocyanine paste is heated to 80° C. 3.5 Parts of nitrobenzene are slowly introduced, i.e., 7.2% by weight of nitrobenzene with respect to the weight of copper phthalocyanine. The stirring is continued for 5 minutes and the mass is run onto a plate. It is dried in a vacuum oven at 80° C. fitted with a condenser for the vapor.

The pigment thus obtained is comparable to that obtained in Example 1, but is still more friable.

EXAMPLE 3

135 Parts of water and 350 parts of a copper phthalocyanine press paste containing 48.5 parts of copper phthalocyanine are placed in a reactor fitted with a stirrer and a dropping funnel. This paste was obtained as indicated in Example 1.

The stirring is started and the aqueous paste of copper phthalocyanine is heated to 80° C. Then 3.5 parts of nitrobenzene, i.e., 7.2% by weight of nitrobenzene with respect to the weight of copper phthalocyanine, are slowly introduced. Stirring is continued for 5 minutes and the nitrobenzene is removed by steam-distillation. The product obtained is filtered and dried at 80° C.

A pigment is thus obtained which is comparable in every respect with that obtained in Example 1.

EXAMPLE 4

135 Parts of water and 350 parts of a copper phthalocyanine press paste containing 48.5 parts of copper phthalocyanine are placed in a reactor provided with a stirrer and a dropping funnel. This paste was obtained as indicated in Example 1.

Stirring is started and 3.5 parts of xylene, i.e., 7.2% by weight of xylene with respect to the weight of copper phthalocyanine, are slowly introduced. Stirring is continued for 3 minutes and the mass is run onto a plate. It is dried in a vacuum oven at 80° C., fitted with a vapor condenser.

A pigment is thus obtained which is comparable to that obtained in Example 2.

EXAMPLE 5

A test in every way identical with that described in Example 1 is carried out, except that the nitrobenzene is replaced by perchlorethylene.

A pigment is obtained comparable to that obtained in Example 1.

EXAMPLE 6

The operation is as in Example 1, except that copper phthalocyanine press paste is used which is obtained by hydrolysis, according to the process indicated in Example 1, of a sulphuric solution containing 71 parts of crude copper phthalocyanine produced from the synthesis in 560 parts of 100% sulphuric acid.

The pigment obtained is comparable to that obtained in Example 1, but it has a slightly inferior vividness.

EXAMPLE 7

The test is in every way identical with that described in Example 1 except that the starting substance is a slightly chlorinated (2.9% of chlorine) copper phthalocyanine.

A blue pigment is obtained, of a shade greener than that of the pigment of Example 1, having a high speed of dispersion and a high tinctorial yield.

EXAMPLE 8

135 Parts of water and 350 parts of a copper phthalocyanine press paste containing 48.5 parts of copper phthalocyanine, are placed in a reactor equipped with a stirrer and a dropping funnel. This paste was obtained as indicated in Example 1.

Stirring is started and the aqueous paste of copper phthalocyanine is heated to 80° C. 2 Parts of N-diethylaniline, that is, 4.1% by weight of N-diethylaniline with respect to the weight of copper phthalocyanine, are slowly introduced. The stirring is continued for 30 minutes, then 25 parts of a 10% solution of sulphuric acid are added to solubilize the N-diethylaniline by acidification. The product is filtered and the pigment of phthalocyanine is washed and dried at 80° C.

A pigment is thus obtained which is comparable to that obtained in Example 1, but having however a slightly superior speed of dispersion in plastic materials.

EXAMPLE 9

The test is in every way identical with that described in Example 3 except that 3.5 parts of nitrobenzene are replaced by 3.5 parts of nitrobenzene and 3.5 parts of isobutanol.

A pigment is thus obtained of a shade redder than that of the pigment of Example 3, having a high speed of dispersion and a high tinctorial yield.

What is claimed is:

1. A process for the preparation of a phthalocyanine pigment from a press paste of phthalocyanine obtained by hydrolysis of a sulphuric solution of phthalocyanine, which consists in incorporating while stirring in said press paste a member selected from the group consisting of from 1% to 20% by weight with respect to the weight of phthalocyanine of a water-insoluble crystallizing solvent and a mixture of said water-insoluble crystallizing solvent with from 1% to 20% by weight with respect to the phthalocyanine of a non-crystallizing solvent, then removing said solvent or solvents and drying the paste, and collecting the pigments thus obtained.

2. The process according to claim 1 in which the water-insoluble crystallizing solvent used is selected from the group consisting of benzene, toluene, a xylene, chlorobenzene, a dichlorobenzene, a trichlorobenzene, nitrobenzene, trichloroethylene, tetrachloroethylene, nonylphenol, N-dimethylaniline, N-diethylaniline, ethyl benzoate and mixtures of said compounds.

3. The process according to claim 2 in which the amount of crystallizing solvent incorporated in the paste is from 3% to 10% by weight with respect to the weight of phthalocyanine.

4. The process according to claim 3 in which the phthalocyanine press paste used in a press paste of a member selected from the group consisting of copper phthalocyanine and chlorinated copper phthalocyanine.

5. The process according to claim 2 in which the phthalocyanine press paste used is a press paste of a member selected from the group consisting of copper phthalocyanine and chlorinated copper phthalocyanine.

6. The process according to claim 1 in which the phthalocyanine press paste used is a press paste of a member selected from the group consisting of copper phthalocyanine and chlorinated copper phthalocyanine.

7. The process according to claim 1 in which amount of crystallizing solvent incorporated in the paste is from 3% to 10% by weight with respect to the weight of phthalocyanine.

8. The process according to claim 1 in which the water-insoluble crystallizing solvent alone is used.

9. The process according to claim 8 in which the water-insoluble crystallizing solvent used is selected from the group consisting of benzene, toluene, a xylene, chlorobenzene, a dichlorobenzene, a trichlorobenzene, nitrobenzene, trichloroethylene, tetrachloroethylene, nonylphenol, N-dimethylaniline, N-diethylaniline, ethyl benzoate and mixtures of said compounds.

10. The process according to claim 9 in which the amount of crystallizing solvent incorporated in the paste is from 3% to 10% by weight with respect to the weight of phthalocyanine.

11. The process according to claim 10 in which the phthalocyanine press paste used is a press paste of a member selected from the group consisting of copper phthalocyanine and chlorinated copper phthalocyanine.

12. The process according to claim 9 in which the phthalocyanine press paste used in a press paste of a member selected from the group consisting of copper phthalocyanine and chlorinated copper phthalocyanine.

13. The process according to claim 8 in which the phthalocyanine press paste used in a press paste of a member selected from the group consisting of copper phthalocyanine and chlorinated copper phthalocyanine.

14. The process according to claim 8 in which the amount of crystallizing solvent incorporated in the paste is from 3% to 10% by weight with respect to the weight of phthalocyanine.

15. The process according to claims 1, 2, 3, 4, 5, 6, 7, 8, 9, 10, 11, 12, 13 or 14 in which the solvent or solvents is or are eliminated by evaporation during the drying phase of the paste.

16. The process according to claims 1, 2, 3, 4, 5, 6, 7, 8, 9, 10, 11, 12, 13 or 14 in which the solvent or solvents is or are eliminated by steam-distillation before drying the paste.

17. The process according to claims 1, 2, 3, 4, 5, 6, 7, 8, 9, 10, 11, 12, 13 or 14 in which the crystallizing solvent has an acid or basic character and is eliminated by solubilizing it in water by salification.

* * * * *